United States Patent [19]

Elton et al.

[11] Patent Number: 5,104,914
[45] Date of Patent: Apr. 14, 1992

[54] PREPARATION OF POLYMER DISPERSIONS AND PHOTOGRAPHIC ELEMENTS CONTAINING POLYMER PARTICLES

[75] Inventors: Peter J. Elton; John L. Cawse, both of Macclesfield, England

[73] Assignee: Ilford Limited, Cheshire, England

[21] Appl. No.: 523,579

[22] Filed: May 10, 1990

[30] Foreign Application Priority Data

May 23, 1989 [GB] United Kingdom ............... 8911859

[51] Int. Cl.$^5$ .................. C08L 89/04; C08L 1/26; C08L 3/04; C08L 29/04
[52] U.S. Cl. ......................... 524/22; 524/21; 524/25; 524/43; 524/44; 524/45; 524/47; 524/459; 524/485; 524/503; 524/704
[58] Field of Search ........... 524/21, 22, 25, 43, 524/44, 45, 47, 503, 459, 485, 704

[56] References Cited

U.S. PATENT DOCUMENTS 3,070,442 12/1962 Cohen et al. ........................ 524/22
3,926,869 12/1975 Horie et al. ......................... 524/22
4,855,219 8/1989 Bagchi et al. .
4,861,818 9/1986 Timmerman et al. .

Primary Examiner—Paul R. Michl
Assistant Examiner—Peter Szekely
Attorney, Agent, or Firm—Darby & Darby

[57] ABSTRACT

It is the object of this invention to provide a method for the preparation of an antiblocking agent which is effective in its antiblocking activity but is considerable less visible in photographic enlargements made from the film containing the antiblock of this invention.

There is described a process for the preparation of monodispersed polymer particles between 5 and 10 microns in diameter which comprises preparing a dispersion of monosized seed polymer particles and then adding to this dispersion an ethylenically unsaturated monomer which is different from the monomer used to prepare the seed polymer particles, together with a polymerization initiator and completing the polymerization, the refractive index of one of the polymers produced being greater than 1.54 and the refractive index of the other polymer being less than 1.54.

The refractive index of gelatin is 1.54. There is produced by the process of the present invention a particle which comprises two polymers. Most preferably one polymer has a refractive index which is as much below 1.54 as the other polymer has a refractive index above 1.54. Preferably the final particles comprises substantially equal amounts of the two polymers.

6 Claims, No Drawings

PREPARATION OF POLYMER DISPERSIONS AND PHOTOGRAPHIC ELEMENTS CONTAINING POLYMER PARTICLES

BACKGROUND OF THE INVENTION

It is well known that photographic films can suffer from deleterious effects owing to excessively close contact between adjacent layers of film or between a layer of film and an attached layer of a second flexible material, for example a paper strip backing in the case of roll film. These deleterious effects take the form of sticking, or blocking, of one layer to another or merely of a tendency to accumulate an electrostatic charge which is dissipated when the two layers are separated. In the latter case a visible discharge of light can arise which can fog the film.

It is therefore well known to incorporate in one or more layers and on one or more sides of the photographic film, an antiblocking agent in the form of finely divided hard particles, either of a mineral or more usually of a polymeric nature. Most typically these particles are spherical and often their particle size is closely controlled, since it is well known that very large particles (e.g., having a diameter of about 10 micrometers or more) may be readily seen in photographic prints prepared from the photographic film in which the particles are included. However, a particle size of about 2 to about 8 microns is necessary in order to achieve a useful separation effect between two adjacent film layers, which requires that typically between about 1 and about 7 microns of the particle diameter protrudes from the film.

Owing to the relatively large size of the above-described particles, it is quite commonly found that when such a film is printed, an effect known as "Starry Night Effect" is observed. It consists of a series of visible images of the antiblock particles themselves. This effect may be particularly noticeable when the refractive index of the antiblock particle is very different from that of the photographic coating layer in which the particle is embedded.

OBJECT OF THE INVENTION

It is an object of this invention to provide a method for the preparation of an antiblocking agent which is effective in its antiblocking activity but is considerably less visible (compared with antiblock agents of the prior art) in photographic enlargements made from the film containing the antiblock of this invention.

Another object of this invention is to provide improved coating layers for photographic elements, said layers incorporating antiblock agents having effective antiblock properties and low visibility characteristics; and improved photographic elements having effective antiblock properties.

SUMMARY OF THE INVENTION

The present invention is directed to a process for the preparation of substantially monodisperse polymer particles between about 3 and about 10 microns in diameter, the process comprising preparing a dispersion of substantially monosized seed polymer particles and then adding to this dispersion an ethylenically unsaturated monomer which is different from the monomer (or monomers) used to prepare the seed polymer particles, together with a polymerization initiator and completing the polymerization, the refractive index of one of the polymers being greater than the refractive index of the coating layer of the photographic element in which the particles will be embedded and the refractive index of the other polymer produced being less than said coating layer index, such that the final refractive index of the composite particles be about equal to that of the hydrophilic colloid of the film in which said particles are to be used as an antiblock agent.

In another aspect, the invention is directed to a photographic element coating layer bearing polymeric antiblock particles having substantially the same final refractive index as the coating layer itself and to a photographic element bearing such a coating layer.

DETAILED DESCRIPTION OF A PREFERRED EMBODIMENT OF THE INVENTION

The refractive index of gelatin is 1.54. There is produced by the process of the present invention a particle which comprises two polymers. Most preferably one polymer has a refractive index which is as much below 1.54 as the other polymer has a refractive index (R.I.) above 1.54. Preferably, the final particles comprise substantially equal amounts of the two polymers. However, the relative amounts of the two polymers can be adjusted by reference to their relative refractive indexes such that the final refractive index of the composite particles is about 1.54 (or about equal to the R.I. of the coating layer material in which they will be embedded), if such material is different from gelatin.

It might be thought to be preferable to use a single polymer for the antiblock particles whose refractive index is approximately 1.54, but such polymers are not readily available. For example, vinyl furan from which polyvinyl furan can be formed and which has a refractive index of 1.54 is no longer available commercially. Nevertheless, methods for producing vinyl furan are known and are set forth in Beilstein: *Handbuch der Oroanischem Chemie*, 17:385, Springer-Verlag, New York, 1974 and thus the use of single polymer having an R.I. about equal to that of a hydrophilic colloid is within the invention.

Two particularly suitable monomers to be used in the process of the present invention (for making antiblock particles) are styrene and methyl methacrylate. Polystyrene has a refractive index of 1.59 and polymethylmethacrylate has a refractive index of 1.49. Poly(cyclohexyl methacrylate), which is used in one Example, has a refractive index of 1.507.

Conveniently, the dispersion of substantially monosized seed particles is itself formed by a dispersion polymerization process. Preferably, the polymer of the seed particles is polystyrene.

"Substantially monodisperse" is a particulate dispersion wherein a considerable fraction of the particles are of a particle size close to the mean particle size. By way of nonlimiting example a dispersion wherein 70–80% of the particles are within 10% above or below the mean particle size shall be considered to be "substantially monodisperse".

Methods for the preparation of substantially monodisperse seed dispersions are described for example in L. Antl et al., Colloids and Surfaces 17 (1986) 67 and in J. W. Goodwin et al., British Polymer Journal 5 (1973) 347. The dispersions may be prepared using a solvent (or continuous phase) which is preferably subsequently replaced, for example by a process of azeotropic distillation, by a different solvent in order to facilitate the carrying out of the particle swelling and growth process which occurs when the second monomer is added. For example a polystyrene seed may be prepared by a dispersion polymerization process in the presence of hexane as a continuous phase. The hexane may be sequentially replaced, by a distillation process, with ethanol. The thus-formed dispersion of polystyrene in ethanol may then be used as a seed dispersion from which to prepare a dispersion of this invention using methylmethacrylate as a second monomer. Following polymerization of the methylmethacrylate the ethanol may then be sequentially replaced by water to form an aqueous-based dispersion suitable for incorporation into a layer of a photographic element.

The process of azeotropic distillation to effect solvent replacement can be conducted in a conventional manner, for example, as described inn *The Purification of Laboratory Chemicals*, 2d. Edition, Perrin, D. D., Armarego, W. L. F. and Perrin, D. R., Editors, Pergamon, Oxford 1980, P. 13. It most often involves forming a constant boiling mixture between the solvent which needs to be removed and one or more other components selected to yield an azeotrope that has a lower boiling point than of its constituents.

Solvent replacement is carried out by addition (continuous or intermittent) of the new solvent to replace an equal reported volume of the original solvent while the original solvent is being removed.

The original solvent used for preparing the seed polymer must be a good solvent for the first monomer but a poor solvent for the polymer formed by polymerization of the first monomer (herafter "first polymer").

In general, it is preferred that the second monomer be relatively insoluble (i.e., less than about 10% soluble and preferably less than about 5% soluble) in the continuous phase which constitutes the dispersion medium of the seed polymer (in order to avoid homopolymer particle formation during polymerization of the second polymer). The solvent forming the continuous phase for the second polymerization must be a poor solvent for both the first and the second polymer, but should dissolve at least part (e.g., about 5%-30%) of the second monomer (it does not need to dissolve any more of the second monomers).

The final solvent (i.e., the one used for coating) should be water. The second solvent may already be water, in which case, no further solvent replacement is needed or desired.

Nonlimiting examples of the first stage or seed polymer which may be prepared are polystyrene, polyvinyltoluene, polymethyl methacrylate, cellulose acetate and polyvinylidene chloride. (It should be noted that the sequence of "first" and "second" polymerization can be reversed.) Cross-linking agents may additionally be present in the seed polymer, for example, divinylbenzene, to crosslink polystyrene. Nonlimiting examples of the second monomer are (it is to be understood that the polymer formed from the second stage monomer is different from that of the seed) aromatic monomers such as styrene, fluorostyrenes, methyl styrene, divinylbenzene, vinyl toluene, vinyl furan, vinyl naphthalene, as well as acrylate monomers such as esters of methacrylic acid and particularly methyl methacrylate; esters of acrylic acid, trivinyl cyclohexane, vinyl furoate and 2-vinyl mesitylene. Among the esters of methacrylic acid which may be used are benzyl, iso-bornyl, cyclohexyl, furfuryl, hydroxypropyl, naphthyl, vinyl; and polyfunctional esters such as ethylene dimethacrylate. Mixtures of more than one monomer may also be used for each stage. As hereinbefore stated the monomers should be chosen so that one polymer has a refractive index above 1.54 and the other below 1.54.

As stated above, the solvent selection for each polymerization depends on the properties of the monomer used and/or the polymer formed. The following are nonlimiting examples of preferred monomers (for seed particle formation) and preferred solvents for a suspension polymerization in which seed particles are formed:

| Monomer | Seed Polymer | Solvent |
| --- | --- | --- |
| styrene | polystyrene | ethanol, hexane, acetic acid |
| vinyl toluene | poly(vinyltoluene) | ethanol, hexane, acetic acid |
| methacrylate (e.g., methyl, cyclohexyl, iso-bornyl) | polymethacrylate | cyclohexane, hexane, carbon tetrachloride, ethanol, methanol |
| vinylidene chloride | poly(vinylidene chloride) | ethanol, cyclohexane |
| acrylonitrile | polyacrylonitrile | ethanol, butanone |

For second stage polymerizations the most suitable solvents generally are water, water/ethanol mixtures and water/acetic acid mixtures.

Nonlimiting examples of the initiators which may be used and are well known to those practiced in the art include benzoyl peroxide, t-butyl hydroperoxide, lauryl peroxide, dicumyl peroxide, azobis(isobutyronitrile), azobis(cyanopentanoic acid) and azobis(methyl isobutyrate). It will be understood that the initiator chosen for the second polymerization must be soluble in the monomer to be polymerized and relatively insoluble in the continuous phase solvent.

During the addition of the second monomer to the seed dispersion, there may therewith be added dispersing agents or colloid stabilizers in order to maintain the stability of the dispersion being formed. Examples of such dispersing agents are anionic and nonionic surfactants, block and graft copolymers for example poly (12-hydroxystearic acid)-graft-polyglycidyl methacrylate and water soluble polymers such as polyvinyl alcohol, polyvinylpyrrolidone and hydroxyethyl cellulose. Such dispersing agents are well-known and commercially available. Examples of the graft copolymer dispersing agents and their synthesis may be found in *Dispersion Polymerization in Organic Media*, Barrett, K. E. J., editor, John Wiley, New York 1975, pp.106-110. However, it is important that the quantity of such additives used is kept at a low level (preferably < about 5% of the second monomer by weight); otherwise, new nuclei may form in the continuous phase and these (homopolymers) nuclei will grow at the expense of the existing seed particles.

Depending upon the polymer and monomers chosen for the preparation of the dispersions of this invention, there may be obtained polymer particles which may either comprise polyblends or core-shell type structures. The polymer particles of Examples 1 to 3 which follow are thought to be of the core-shell type whilst the polymer particles of Examples 4 and 5 are thought to be of the polyblend type. Both types are within the scope of the invention.

If the seed polymer is crosslinked and the added monomer contains a crosslinking monomer, such as ethylene dimethacrylate or divinyl benzene, there may be obtained an interpenetrating network structure, also within the scope of the invention. Additional nonlimiting examples for the crosslinking agents include 1,3,5 trivinyl cyclohexane; trimethylolpropane triacrylate; pentaerythritol tetraacrylate; and tetraethyleneglycol dimethacrylate.

The process of the present invention may be carried out by using preformed seed polymer particles, dispersing them in the dispersing medium and then carrying out the polymerization of the second monomer therein. In this case preferably the dispersion medium of the second polymerization is an aqueous or substantially aqueous medium.

Preferably, however, the process of the present invention is a continuous process and the monosized seed polymer particles are prepared by a dispersion polymerization process (preferably in a substantially non-aqueous solvent). Depending on the solvent used this solvent may be directly replaced by water or a substantially aqueous solvent or the non-aqueous solvent (if it is also water-immiscible) may be first replaced by a non-aqueous but water-miscible solvent which in its turn may be replaced by water or a substantially aqueous solvent. ("Substantially non-aqueous" means containing less than about 10% water by weight. "Substantially aqueous" means containing at least about 60% water by weight.)

For example, if the seed particles prepared in the first stage of the process are polystyrene these particles may be prepared in ethanol and the ethanol can be directly replaced by water or a substantially aqueous solvent. However, if seed particles produced in the first stage of the process are polymethyl methacrylate then they are most preferably produced in a water-immiscible solvent such as hexane. The hexane will then be replaced by a water-miscible solvent such as ethanol which in its turn can be replaced by water. If attempts are made to replace the hexane directly with water, then some coagulation of the dispersion occurs; hence direct replacement of such a solvent with water is not preferred.

Preferably the solvent or solvents are removed by distillation and replaced by water prior to preparation of the antiblock coat.

When the dispersion medium of the polymer particle dispersion prepared by the process of the present invention is water or a substantially aqueous medium it is possible to include a dye in the polymerization system used to produce the second polymer. It is not normally readily possible to dye polymer particles prepared by a single-stage dispersion polymerization method as much of the dye is likely to remain largely in the solvent used for the polymerization.

The purpose of the dye is to reduce (and preferably minimize) the light scattered by the particles which causes refraction problems such as the Starry Night Effect. This dye should be soluble in the ethylenically unsaturated monomer used in this system and also soluble in the polymer formed therefrom. However, it should be insoluble in the dispersion medium which preferably is water. Further the dye must not inhibit the polymerization of the second monomer.

Dyes suitable for incorporation in the second monomer are those types which are well known for the coloration of plastics materials, as may be found for example in the "Color Index", 3rd Ed, Volume 3, 1971, pp 3563-3648 (published by the Society of Dyers and Colourists). Generally suitable are oil soluble organic dyes, with very limited water solubility.

Preferably the dye is a yellow dye as it is thought that it is blue light which is mostly scattered by the polymer particles.

Particularly suitable yellow dyes are "Fat Yellow" made by Hoechst AG and Orasol Yellow ZRLN made by Ciba-Geigy. Both these dyes are substantially water insoluble but both are soluble for example in methyl methacrylate and polymethylmethacrylate.

A useful amount of dye to be present in the final polymer particles is from 0.05% to 10% by weight, but these limits may vary for different polymers and/or dyes and, furthermore, the amount of dye is subject to optimization, as is well known in the art. It is of course desirable to employ the minimum amount of dye that reduce refraction as much as the dye is capable of doing so.

The method of the present invention permits the preparation of composite polymer particles with excellent monodispersity due largely to the excellent monodispersity of the seed particles. The composite particles have a refractive index which may be controlled by careful choice of the types and ratios of the monomers, and can be readily dyed with polymer soluble organic dyes. The choice and types of monomers is made by routine methods. For example, if the target R.I. is that of gelatin, the first and second monomer are chosen so that upon their polymerization their respective polymers will have R.I.s above and below the target value.

The particle size of the final particle is readily controlled by selection of the size of the seed particle and/or the quantity of monomer used during the subsequent growth stage.

We have further found that an advantage of the present invention is that very little coagulant material is typically formed during the polymerization of the second monomer. Coagulum forming on the stirrer and vessel walls during dispersion polymerization is a common problem. However, the methods of the present invention cause little or no coagulum formation and substantially avoid this problem.

It is also typically found that the dispersions formed by the method of the present invention may be very readily added to a photographic element, usually with no additional formulation being necessary.

In order to exert its antiblocking effect the layer which comprises the dispersion of substantially monodispersed polymer particles may be either a non-stress layer coated as a top layer on the silver halide emulsion layer or it may be coated also as a top coating on the side of the element distal to the silver halide emulsion layer.

Therefore, according to another aspect of the present invention, there is provided a photographic element which comprises on a photographic support base at least one silver halide emulsion layer and at least one protective layer which comprises substantially monodispersed polymer particles between 3 and 10 microns in diameter which have been prepared by any one of the methods of the present invention as hereinbefore set forth. Most preferably these particles contain a yellow dye.

The photographic element of the present invention may comprise any of the silver halide emulsion layer or layers as used for black and white or color photography. The photographic base may be any base used for photographic materials such as biaxially oriented polystyrene, polycarbonate or polyethylene terephthalate or a cellulose based material such as cellulose acetate-butyrate or cellulose triacetate. Alternatively the base may be a polyethylene coated paper base. Static electricity is often generated by such paper bases but as the silver halide coated on paper base is usually not very light-sensitive static discharge is usually not strong enough to form a latent image. Nevertheless, antiblock particles may be desired in such paper base to prevent the base from sticking.

The preferred amount of substantially monodispersed polymer particles to be present in the coating layer is from 0.01 to 20.0g per 100g of colloid material and most preferably from 0.1 to 5.0g.

The coating layer may be pure gelatin (preferred) or it may comprise other hydrophilic colloids, such as gelatin derivatives (e.g., limed gelatin; acid-treated gelatin; enzyme-treated gelatin; hydrolyzed products of enzyme-decomposition of gelatin; reaction products of gelatin and acid halides, acid anhydrides, isocyanates, alkanes, sulfones, maleinimide compounds, vinyl sulfonamides, polyalkylene oxides and epoxy compounds) or graft polymers of gelatin (e.g., a homopolymer or copolymer of a vinyl monomer such as acrylic acid, methacrylic acid, methacrylic acid ester, methacrylic acid amide, acrylonitrile or styrene grafted to gelatin) or synthetic hydrophilic polymers (see, e.g., those described in West German OLS 2,312,708; U.S. Pat. Nos. 3,620,751; 3,879,205 et al.) used alone or with gelatin.

Other suitable hydrophilic colloids include proteins such as albumin and casein; cellulose derivatives such as hydroxymethyl, hydroxyethyl and carboxymethyl cellulose and cellulose sulfuric acid ester; sugar derivatives such as sodium alginate and starch derivatives and various synthetic hydrophilic polymers such as polyvinyl alcohol, polyvinyl alcohol partial acetate, poly-N-vinyl pyrrolidone, polyacryene acid, polymethacrylic acid, polyvinylauride, polyvinyl inidatole, and polyvinyl pyrazole.

All of these are commercially available and can also be prepared as is well-known. The refractive indices of hydrophilic colloids are published in *Polymer Handbook*, 2d Edition, John Wiley, New York, 1985, Brandrup J. and Immogut, E. H., Editors, or can be determined using such well-known standard tests as the Abbe refractometer method for liquids or films and the use of refractive index matching fluids and subsequent determination of the refractive index of the matching fluid.

The protective colloid layer may comprise additives in addition to the monodispersed polymer particles. Examples of such additives are humectants (e.g., glycerol, trimethylolpropane), UV absorbing compounds (e.g., the compound of Formula I below as used in Japanese Patent No. 53-129,633A, April 1977), electroconductive compounds such as anionic fluorinated surfactants which are used to reduce electro-static charge, nonionic surface active agents such as saponin or polyethylene glycol alkyl ether used as coating aids and hardening agents such as chromium salts, formaldehyde, etc.

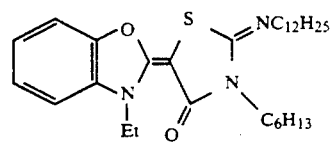

Formula I

When the layer which comprises the substantially monodispersed polymer particles is coated on the side of the assembly distal to the silver halide emulsion layer or layers it may also act as an antihalation layer and comprise process-dischargeable antihalation dyes, such as those disclosed in U.S. Pat. No. 4,294,916 and 4,294,917.

Any of the known techniques used for the application of photographic elements of aqueous coating compositions may be used to coat the layer which comprises the substantially monodispersed polymer particles. For example, the layer can be coated by spray coating, dip coating, swirl coating, extrusion hopper coating, curtain coating, air knife coating, or other coating techniques. The thickness of the coated layer will depend upon the particular requirements of the element involved. Typically, the dry weight coverage is in the range of 0.2 to 4 grams per square meter and most usually in the range from 1 to 3 grams per square meter. The coating weight of the particles is between about 0.001 and about 0.1g/m$^2$ and preferably between about 0.005 and 0.05g/m$^2$.

Drying of the coated layer can be carried out over a wide range of temperatures. For example, temperatures of from 20° C. to 130° C. and preferably from 75° C. to 115° C generally give satisfactory results claims.

When the photographic antiblock coating composition is applied indirectly to a polyester film support, a subbing layer is advantageously employed to improve the bonding of the anti static layer to the support. Subbing compositions for this purpose are well known in the art and include, by way of nonlimiting example, interpolymers of vinylidene chloride such as vinylidene chloride/acrylonitrile/acrylic acid terpolymers.

Thus, the method of the present invention provides antiblock particles and a process for their preparation. These particles, when incorporated in a coating layer of a photographic element, reduce 'Starry Night Effect' to acceptable levels while giving excellent antiblocking activity. Alternatively, one may incorporate increased levels of antiblock in order to obtain improved antiblocking ability without unacceptable S.N.E.

Antiblocks of this invention may be used in association with any of the typically used wetting agents, hardeners and other components known to those practiced in the art.

The following Examples will serve to illustrate the invention, without limiting its scope.

EXAMPLE 1

Preparation of monodisperse polystyrene beads 4.18 microns

At room temperature, polyvinylpyrrolidone 146.85g and anionic sulphosuccinate surfactant, 40.71g, are dissolved in absolute alcohol 7270g. Styrene 1818g (25% wt/wt based on solvent), and initiator, azoisobutyronitrile 27.26g are then added and the solution heated to 70° C. for 24 hours.

A 10 liter stainless steel vessel was employed with a two blade paddle stirrer (50-150rpm): after 24 hours a stable alcohol dispersion of monodisperse 4 microns polystyrene microsphere beads was obtained. All of the ethanol was replaced by water to provide a stable aqueous dispersion of the polystyrene seeds having a median particle size of 4.18 microns with 80% of the particles being within the range of between 4.07 and 4.9 microns.

This dispersion was diluted to a solids content of 11.2% with water and 250g of this dispersion heated to 70° C. in a 500 ml glass reaction vessel. Under a nitrogen blanket, and with a stirring speed of about 100rpm, there was added in succession four portions of a solution of azobis (isobutyronitrile) (AIBN), (0.21 g) in methyl methacrylate (6.25 g). Each portion was added over a period of 10 minutes followed by a 50 minute period during which polymerization was allowed to occur.

After the fourth addition had been made the polymerization was allowed to proceed for approximately 24 hours, after which the dispersion was cooled and filtered through a 90 micron sieve. The total amount of material retrieved in a coagulated form was 0.12 g. The solids content of the dispersion was now 17.9%. The median particle size, measured by a Coulter ZM instrument, was 4.35 micrometers with 80% of the particles between 4.18 and 4.87 microns. Ratio of polymethylmethacrylate to polystyrene, 0.89:1. The refraction index of these particles was 1.55.

EXAMPLE 2

In a similar way, dispersions were prepared using respectively more and less methyl methacrylate. A total of 31.16g and 1.04g AIBN were used with an initial polystyrene seed at 8.3% solids to give a dispersion with median particle size 4.47 microns, 80% of particles between 4.31 and 4.60 microns. In a further experiment, a total of 13.96g of methyl methacrylate and 0.48g of AIBN produced a dispersion of median particle size 4.30pm with 80% between 4.15 and 5.31 microns. The ratio of PMMA to polystyrene was 0.67:1. The total refractive index of the composite particles was 1.55.

EXAMPLE 3

A seed polystyrene dispersion, as in Example 1, was diluted ob 8.3% solids with water and heated to 70° C. under nitrogen.

A solution was prepared of the yellow dye Orasol Yellow 2RLN (product of Ciba-Geigy), 0.21g in methyl methacrylate 20.75g together with AIBN 0.68g. This solution was added in a single portion over a period of 1 hour with stirring, followed by 24 hours during which the polymerization was allowed to proceed.

The dispersion was cooled and filtered to give yellow antiblocking agent particles, solids content of dispersion 5.20,%, particle size median 4.42 microns, 80% of the particles between 4.32 and 4.55 microns. The ratio of PMMA to Polystyrene was 1:1. The refractive index was 1.54.

EXAMPLE 4

A two stage polymerization was carried out in which the "seed" dispersion comprised 5 microns diameter polystyrene particles, which had been crosslinked by incorporating 0.1% of divinylbenzene during the polymerization described in Example 1, and the second stage utilized as the monomer a mixture of Thus, to 250 g of the crosslinked polystyrene dispersion held at 70° C. there was added with slow stirring, a mixture of 24.97 g of cyclohexyl methacrylate and 0.03 g of divinylbenzene over 60 minutes. This was then allowed to stand for 4 hours in order that the particles could absorb the second monomer. There was then added a solution of azobis (isobutyronitrile 0.41 g) in methyl methacrylate (5 g) over 15 minutes. One hour later a solution of polyvinyl pyrrolidone K30 (0.62 g) and sulphosuccinate surfactant (0.17 g) in water (10 g) was added over 15 minutes and the mixture was then stirred overnight before cooling and filtering.

There was isolated a dispersion of particles of between 6 and 7 microns in diameter.

EXAMPLE 5

In the same way, yellow dyed particles were prepared as in Example 4 but to the cyclohexyl methacrylate solution was added Fat Yellow 3G (0.25 g). After reacting in the manner described for Example 4 there was isolated a dispersion of yellow particles with mean particle size 6.5 microns.

EXAMPLE 6

An antiblock non-stress coating solution was prepared by mixing together the following two aqueous formulations:

| 1. Water | 700 g | |
|---|---|---|
| Biocide (20% w/v phenol in 50/50 ethanol water) | 9 g | |
| Gelatin | 70 g | mixed to form a gelatin solution |
| Anionic Wetting Agent | 6 g | |
| Nonionic Wetting Agent | 20 g | |
| 2. 10% by Weight of Polymer Particle Dispersion in Water | 7 g | |
| Gelatin Hardening Agent | 2.5 g | mixed to form a |
| Water | 400 g | polymer dispersion |
| pH | 6.1 | |

The two aqueous solutions were mixed.

Six such aqueous dispersions were prepared:

1. Comprised the yellow polymer particles as prepared in Example 3.
2. Comprised the polymer particles as prepared in Example 1.
3. Comprised standard polymethylmethacrylate particles having a means size of 6 microns.
4. Comprised standard polystyrene particles having a means size of from 4-5 microns.
5. Comprised polystyrene particles non-monosized having a particle range of from 1-10 microns.
6. Comprised no polymer particles.

Preparation of Photographic Element

A photographic silver halide iodobromide emulsion comprising 4% iodide and having an average particle size of 0.5 microns was coated on a subbed polyethylene terphthalate film base. Separate portions of this were coated with the six aqueous coating solutions set forth above, by dip-coating. These coatings were dried to provide antiblock layers on the silver halide emulsion.

Testing for Antiblock Properties

An adhesive tape was placed on the surface of all the photographic assemblies in contact with the polymer particle containing layer. No pressure was applied. The adhesive tape was of a high quality with a very even coating of adhesive. The force required to separate the adhesive tape from the film bead-containing layer was then measured using an Instron table model 1026. The results are showing in the table below (cross-head speed 50 cm/min; chart recorder speed 20 cm/min).

TABLE 1

| Dispersion | Force (g) |
|---|---|
| 6 | 135 g |
| 5 | 90 g |
| 3 | 73 g |
| 1 | 64 g |
| 2 | 64 g |
| 4 | 64 g |

The greatest force required to separate the adhesive tape was when no antiblock is present at all, due to a large surface area of contact (Dispersion 6). The force is reduced for the 1-10 microns size range (Dispersion 5). However, there is a second significant reduction in force required to separate the adhesive tape from the photographic assemblies containing dispersions 1, 2, 3 and 4, when compared with the polydisperse polystyrene bead sample (1-10 microns) (Dispersion 5).

This demonstrates the effectiveness of the monodisperse polymer antiblocking agents prepared according to the method hereinbefore set forth.

Photographic Test

Samples of each of the six coatings were light exposed and developed in a conventional film developer. Samples of each of these negatives were then printed on monochrome photographic paper material at a ×20 magnification using a diffuser head.

Both the developed negative films and the prints obtained therefrom were inspected to determine how visible were the polymer particles in the negatives and how many dots of white light were present on the printed enlargements (Starry Night Effect).

A subjective visibility rating (from 1 least visible to 5 most visible) was derived for all the samples when comparing them to Dispersion 6 which contained no polymer particles.

TABLE 2

| Dispersion | Visibility Rating |
|---|---|
| 6 | 1 |
| 1 | 2 |
| 2 | 3 |
| 3 | 4 |
| 5 | 5 |
| 4 | 5 |

Thus the particles in Dispersion 2 which are particles as prepared by the present invention containing two polymers, the refractive index of the particles being 1.55 were less visible and caused a smaller 'Starry Night Effect' than when using polymer particles comprised of a single polymer. However, the best result was obtained using the particles having a refractive index of 1.55 and a yellow dye (Dispersion 1).

We claim:

1. A composition of matter comprising substantially monodisperse composite polymeric particles made from polymerization of a first monomeric composition, said first polymerization resulting in polymer having a refractive index higher than that of a preselected hydrophilic colloid substance, said first polymerization being followed by a second polymerization of a second monomeric composition, said second polymerization resulting in a second polymer having a refractive index lower than that of said substance, said composite particles having a refractive index substantially equal to those of said colloid substance.

2. The composition of claim 1 said particles comprising at least one polymer having a higher refractive index than said colloid and at least one polymer having a lower refractive index than said colloid.

3. The composition of claim 1 said particles having an average diameter within the range of about 3 to about 10 microns.

4. The composition of claim 1 wherein said substance comprises gelatin.

5. The composition of claim 1 said composition further comprising said hydrophilic colloid substance.

6. The composition of claim 1 wherein said first monomeric composition comprises styrene and said second monomeric composition comprises methyl methacrylate.

* * * * *